W. N. WILLIS.
Apparatus for Converting Motion
No. 201,143.  Patented March 12, 1878.
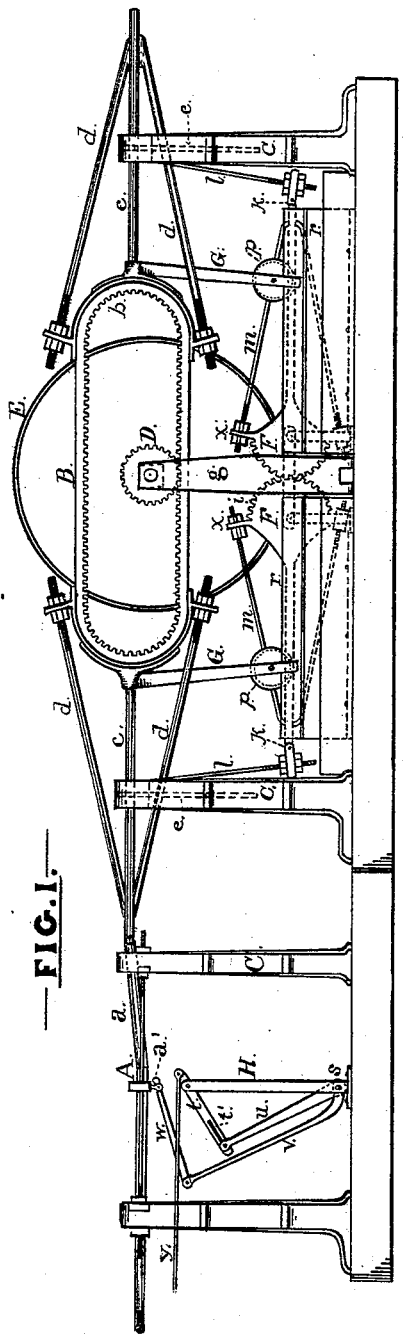
FIG. I.
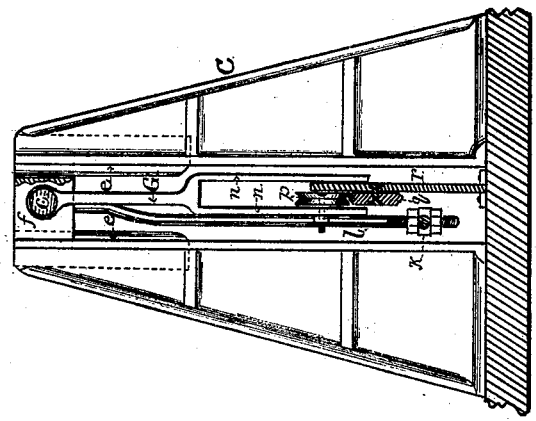
FIG. III.
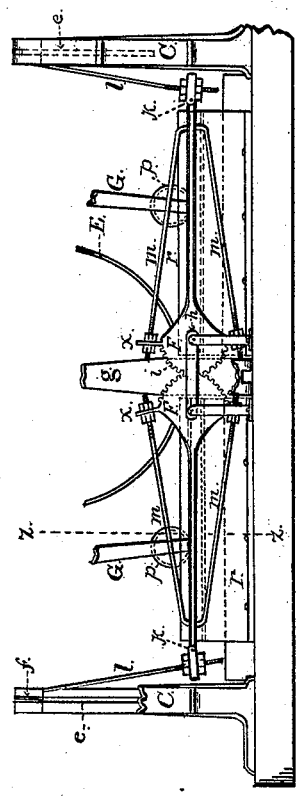
FIG. II.
WITNESSES:
Chs. E. Lewis
Jno. F. Spedden
INVENTOR:
Walter N. Willis
By his Attorney
Chas. B. Mann

UNITED STATES PATENT OFFICE.

WALTER N. WILLIS, OF TRAPPE, MARYLAND.

IMPROVEMENT IN APPARATUS FOR CONVERTING MOTION.

Specification forming part of Letters Patent No. 201,143, dated March 12, 1878; application filed October 24, 1877.

*To all whom it may concern:*

Be it known that I, WALTER N. WILLIS, of Trappe, in the county of Talbot and State of Maryland, have invented a new and useful Improvement in Apparatus for Converting Rotary into Reciprocating Motion, which is fully set forth in the following specification and accompanying drawing, in which—

Figure 1 is a front elevation of the apparatus, showing my improvement. Fig. 2 is a view from the rear side. Fig. 3 is a section through the line $z\ z$ in Fig. 2 on an enlarged scale.

My invention has for its object the more complete utilization of the power of the stroke of the piston, and to diminish the jerking motion of the same resulting from the use of cranks to which the connecting-rod is usually attached. To this end, in my improvement the power of the piston is applied, instead of to a crank, to the substitute therefor, and is exerted continuously in the direct line of the piston-stroke, except at the moment of passing the "dead-center."

My invention will first be described in connection with the drawing, and then pointed out in the claims.

A represents the piston-rod, to which the connecting-rod $a$ is jointed. B is a frame, the long sides of which are parallel and the ends semicircular, and is provided with cogs $b$ around its inner sides, and has attached at either end horizontal rods $c$, which are braced by the rods $d$, with their screw-threaded ends secured to the partly circular-shaped ends of the frame, which has a reciprocating movement between the standards C C, which latter consist of two parallel uprights, provided on their inner sides with vertical guides $e$, in which a box, $f$, moves up and down, the latter affording a bearing for the rods $c$, before mentioned.

D is a pinion, the teeth of which gear with the cogs $b$. This pinion is keyed to a shaft, having the fly-wheel E attached, the bearings of the shaft being supported by a standard, $g$, on each side of the frame.

F F are levers, pivoted at $h$, the ends $i$ of which are arc-shaped, and provided with teeth or cogs, which gear into each other. The rods $m$ form the long arms of the levers, and are secured to the arc-shaped parts by set-screws $x$, and, uniting at $k$, are jointed to the reaches $l$, the upper ends of which are attached to the vertically-sliding boxes $f$, before mentioned.

G G are gages, rigidly secured to the horizontal rods $c$, close to the frame, or to the frame, having their lower ends forked, forming prongs $n$, Fig. 3. A grooved friction-roller, $p$, is attached in the fork to the rear prong, and this roller travels around the guide-plate $q$, which has beveled edges corresponding to the groove on roller. As the width of this guide-plate regulates the extent of rise and fall of the frame, (the size of the rollers being fixed on,) the aim, in practice, should be to make it only of sufficient width to afford the requsite strength and solidity, thereby reducing to a minimum that portion of the circuit described by the frame where the power of the piston is least effective. The guide-plate is bolted to the plate $r$, the lower edge of which is secured to the bed-piece. As the prongs $n$ of the vertical gages G are astride both of guide-plate $q$ and plate $r$, all liability of lateral displacement is avoided.

H represents a standard, near the base of which is a rock-shaft, $s$, and at the top of which is pivoted a lever, $t$, with lower end slotted, as shown at $t'$. Attached to the shaft is an arm, $u$, having at its free end a pin, which plays in the slot $t'$. A lever, $v$, is also attached to the shaft, and at its top has jointed the rod $w$, which connects with the sliding box $a'$, supporting the piston. $y$ is the connecting-rod attached to cut-off.

Having described my invention, I claim and desire to secure by Letters Patent—

1. The frame B, the long sides of which are parallel and the ends curved, having cogs $b$ around the inner sides, and horizontal rods $c$ attached to the ends and connecting with the piston-rod, with bearings $f$ moving in vertical guides $e$, and the pinion D, keyed to a shaft having a fly-wheel attached, as shown and described.

2. The pivoted levers F F, having arc-shaped ends, provided with teeth which gear, and with the long arms jointed to the upward-extending reaches $l$, which are attached to the vertically-sliding boxes or bearings $f$, as shown and described.

3. The gages G G, secured to the horizontal rods or to the frame, having their lower ends forked, in which a friction-roller is attached, in combination with guide-plates $q$ and plates $r$, as shown and described, and for the purpose specified.

4. The mechanism to be connected with the cut-off, consisting of standard H, lever $t$, having one end pivoted to the standard and the other end slotted, in which plays a pin on the end of arm $u$, which is attached to the rock-shaft $s$, and the lever $v$ and rod $w$, connecting with sliding box $a'$, and the connecting-rod $y$, as shown and described.

WALTER N. WILLIS.

Witnesses:
THEODORE C. SCHNEIDER,
CHARLES F. WILLIS.